No. 688,919. Patented Dec. 17, 1901.
G. L. ADDENBROOKE.
ELECTROSTATIC INSTRUMENT.
(Application filed June 10, 1901.)
(No Model.) 2 Sheets—Sheet 1.
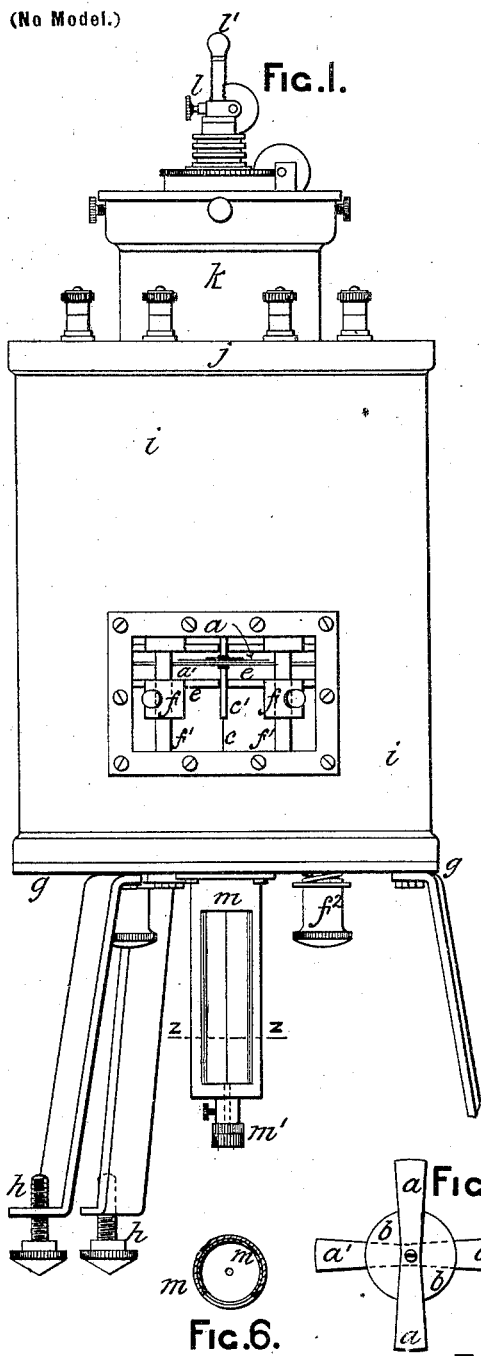
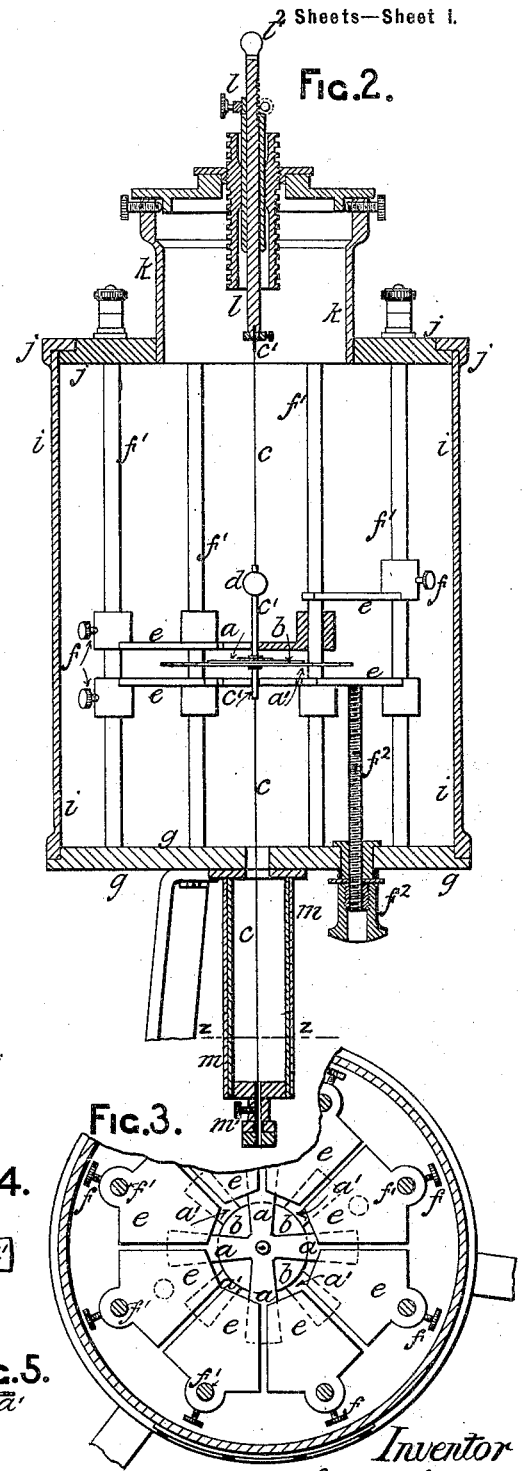
Witnesses.
Inventor
George Leonard Addenbrooke,
by Fairfax & Wetter,
Attorneys.

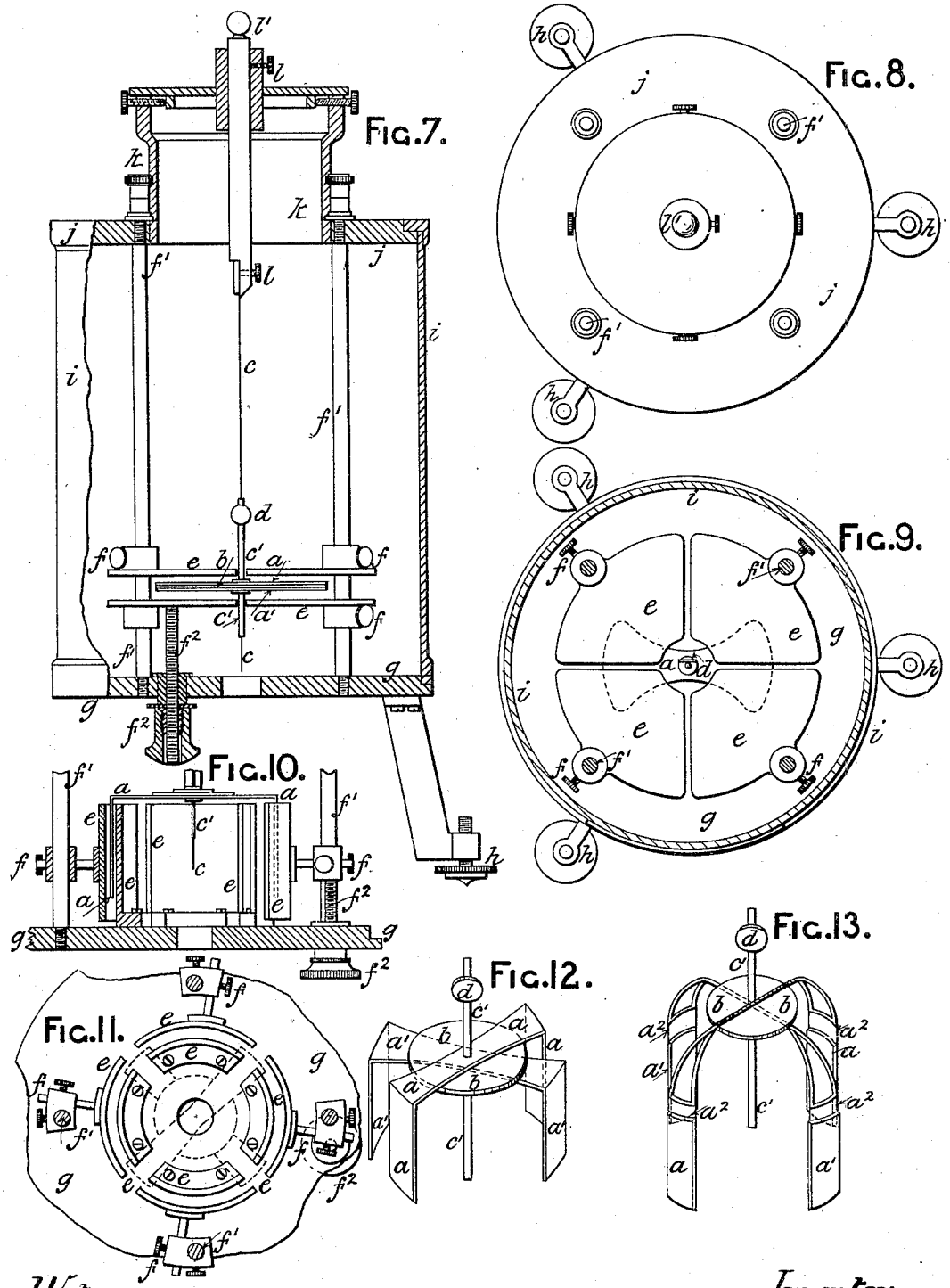

UNITED STATES PATENT OFFICE.

GEORGE LEONARD ADDENBROOKE, OF WESTMINSTER, LONDON, ENGLAND.

ELECTROSTATIC INSTRUMENT.

SPECIFICATION forming part of Letters Patent No. 688,919, dated December 17, 1901.

Application filed June 10, 1901. Serial No. 63,991. (No model.)

*To all whom it may concern:*

Be it known that I, GEORGE LEONARD ADDENBROOKE, a subject of the King of Great Britain and Ireland, whose post-office address is 53 Victoria street, Westminster, London, England, have invented certain new and useful Improvements in Electrostatic Instruments, of which the following is a specification.

This invention relates to electrostatic instruments used for measuring or testing electric-current energy—such as voltmeters, ammeters, and wattmeters—and a part hereof constitutes an improvement upon British Letters Patent No. 25,752, dated December 6, 1898.

The objects in view are to eliminate or reduce an important source of error known to exist in such instruments and to lessen the danger to the operator and the instrument used when engaged with currents of high potential and to improve some of the details or arrangements of parts of the said instruments in order to make them more sensitive, cheaply, efficient, and convenient in use.

The late Dr. John Hopkinson noticed in 1886 that on reversing the poles of a battery used in charging an electrometer a slight difference occurred in the respective deflections produced, which varied according to the way the poles of the said batteries were connected. This he traced to the contact difference between an aluminium needle and gilt-brass quadrant-plates, these forming the metallic extremities of the electrostatic circuit, and he gave a formula for calculating the error. This contact error is of no great importance when the voltage of the charging-battery amounts to several hundred volts; but if the voltages used are not more than one hundred volts the aforesaid error may be noticeable and in making exact measurements should be allowed for. The error is especially noticeable where the voltages employed are much lower than one hundred volts, and this is often the case in using electrostatic voltmeters. If such an instrument be used to give a readable deflection for voltages of the order of one bolt, the amount of the contact error may be such as to render the instrument (as ordinarily constructed) and its indications almost useless, or else it would involve much trouble and calculation to interpret its true readings from the observed readings. Consequently it is very desirable to remove the source of error or at least to reduce the amount of the error. Apparently the best means of doing this would be by making the quadrants also of aluminium; but by careful experiment I have found it difficult to obtain two specimens of aluminium which are in the same electrical state, and quite often the contact difference between aluminium quadrants and an aluminium needle is very considerable. Therefore the conclusion arrived at is that owing to its uncertain character aluminium is a very undesirable metal to introduce into electrostatic instruments intended for exact measurement, so that it is wise to avoid its use altogether. Instead, therefore, of using aluminium for the needles employed and in order to preserve a low specific gravity I make the vanes or needles of the best mica, split into very thin flat sheets, and by coating them with wax, paraffin, or other suitable material and covering the same with two or three times the usual thickness of gold-leaf where gold-plated quadrants are employed in the instrument and similarly with silver-leaf where silver quadrant-plates are used an excellent and very thin needle not easily deformed can be made. For cheaper instruments with brass quadrants I use a brass needle, described hereinafter, and such needles when properly made are as light as or lighter than those hitherto made of aluminium and may be relied upon to have a very small contact difference, if any; but even if the former it decreases by aging.

In the further description of this invention reference is made to the accompanying drawings, in which—

Figure 1 is a front elevation of an electrostatic instrument, one of the supporting-legs being broken away to give room for the drawing of other figures beneath. Fig. 2 is a vertical section of the same or a similar instrument to that shown in Fig. 1, (each being adapted for a double needle,) the supporting-legs of which are similarly omitted to make room for Fig. 3, which is a plan through the central part of Fig. 2, taken so as to show what are usually termed the "quadrant-plates," (as above mentioned;) but in the figure specified there are eight sector-plates indicated instead of the usual four. Fig. 4 is a plan of a double needle, and Fig. 5 is a vertical section thereof. Fig. 6 is a sectional plan taken through a double tubular casing on the line z z, shown in both Figs. 1 and 2 as depending from the main part of the instrument and placed centrally between the three supporting-legs. Fig. 7 is a sectional elevation of a similar instrument to Figs. 1 and 2, but simpler in its construction at the upper suspending device and adapted for use with a single needle and the usual four or quadrant plates. Fig. 8 is a top plan of Fig. 7, and Fig. 9 a sectional plan of Fig. 7, taken just above the aforesaid quadrant-plates. Fig. 10 is a part sectional elevation, and Fig. 11 a plan, of vertical quadrant-plates arranged as segments of a cylinder; and Figs. 12 and 13 are perspective views of double needles, either of them adapted for use with the said cylindrical quadrant-plates.

The reference-letters used throughout refer in each case to similar functional parts.

In the drawings, $a$ denotes a single (or top) needle, whatever its shape may be, and it is always suspended when in use by a wire from the upper part of the instrument. A similar needle $a'$ is sometimes compounded with but insulated from the top needle $a$ by a disk of mica $b$ placed between them, the lower needle $a'$ being always placed at an angle beneath the upper one and electrically connected by a wire to a lower terminal of the instrument. The form or outline of an ordinary needle $a$ is indicated partly by dotted lines and partly by full lines in Fig. 9, its broad paddle ends being shown as lying between the upper and lower quadrant-plates of the instrument and contrasting with the simplest form of my improved needle $a$. (Shown in Fig. 4.) This consists of a narrow blade slightly wider at the ends than in the center, and it is compounded at right angles with a lower needle $a'$ of similar shape, an insulating-disk of mica $b$ separating the two. The compound needle, Figs. 4 and 5, is well adapted for use in the simple form of instruments having the ordinary quadrant-plates, as in Fig. 9; but sometimes the upper needle $a$ is made of a cross-shape (like the two needles in Fig. 4, but in one piece) and compounded with a lower needle $a'$ of the same shape placed at such an angle that the lower blades lie midway between the upper ones, this arrangement being well adapted for instruments having eight upper and lower sector-plates (shown in Fig. 3) instead of the ordinary quadrant-plates. A wire $c$ is used for suspending the upper needle $a$ and conducting the electrical charge thereto, and a similar wire $c$ is used for conducting the charge to the lower needle $a'$ from an electrical terminal beneath the instrument. It is convenient to reinforce the wire $c$ by a wider or enlarged strip $c'$ immediately adjoining the needles and the upper and lower terminals, so as to make better electrical and mechanical connection thereto and to carry the reflecting-mirror $d$ just above the upper needle $a$. Both the quadrant and the sector plates are denoted by $e$ and the means of adjusting them in position by $f$ upon vertical rods $f'$, upon which they are adapted to slide. The base $g$ of the central part of the instrument is mounted upon three suitable legs having leveling-screws $h$, the said base carrying the rods $f'$ and a cylindrical inclosing case $i$. On the top of the rods $f'$ a plate $j$ is mounted, the latter carrying a lantern-case $k$, which is provided with adjustable means, such as $l$, for carrying and adjusting the needle-suspending wire $c$ and conveying the electrical charge thereto. A somewhat similar adjustable means and terminal for the lower wire $c$ (when used with a double or compounded needle) is provided by the double tube $m$ and terminal $m'$, which hangs from the bottom of the base $g$ between the supporting-legs, the tubes having a sight-opening, as shown in Figs. 1 and 6, the outer tube capable of sliding or turning on the inner one.

As before mentioned, the mica needles $a$ and $a'$ are so cut out of thin sheets of mica as to have two or four arms, as required, and coated with gold or silver leaf of two or three ordinary thicknesses, which are made to adhere to the mica by a thin coating of wax, paraffin, varnish, or other suitable adhesive substance. By soldering the wire $c$ or $c'$ thereto and making a good electrical connection between the wire and the metallic coating of the mica, as aforesaid, or by means of extra gilding around the end of the wire, or a small washer on the latter pressed down upon the metal coating, or otherwise, and securing the mirror on the wire also with shellac or the like the needle, if a single one, is ready to be suspended to the insulated adjustable terminal $l$ in the ordinary manner; but if a compound or double needle $a$ and $a'$ is required the lower needle is made in a similar manner to the upper one and the two combined upon and carefully insulated from each other by a disk of mica, with the arms of the two needles alternating symmetrically with each other, as shown in Fig. 3. In this position they may be secured by shellac or other suitable substance and mounted in position between the upper and lower adjustable terminals $l'$ and $m'$, the upper extremity of the terminal $l'$ being a knob to receive the electrical charge. The brass needles previously mentioned are made from very thin brass sheets cut out in a similar manner to the mica disk. The thin brass, however, is scored, pressed, or fluted to give it stiffness, and it is used with brass quadrant or sector plates, both the plates and the needles, however, being slightly coated with oxid (artificially done or by long exposure or "aging" in the atmosphere) before using, as I find that is important in eliminating or reducing the aforesaid contact error; but in the case of using brass for the compound needle (shown in Fig. 12)

the arms are greatly lengthened and bent at right angles at the required distance from the center, so as to hang in a dependent manner from the (in part) supporting mica disk, and adapted thus to be placed between the vertical segmental quadrant-plates, (shown in Fig. 10;) but in some cases a mica needle is also made in this manner, as shown in Fig. 13, the mica arms $a$ and $a'$ being coated with gold or silver leaf, as aforesaid, and connected to a wire passing across the upper and lower surface of the mica disk by thin metallic strips $a^2$, so that the arms may hang vertically without distortion between the vertical segmental quadrant-plates of Fig. 10.

The quadrant or sector plates $e$ are generally provided with socket ends, in which is a set-screw $f$, whereby the plates are adjusted on vertical rods $f'$ in desired proximity to the surfaces of the single or compound needles, one or more of the lower plates sometimes having an outside adjusting turn nut and screw, (indicated by $f^2$ in Figs. 1, 2, and 7,) which is operated from beneath the base $g$, so as to give a fine adjustment of the lower plate, to which the screw is secured, and serving to set the level of the other lower plates to. I find that by suitable and close adjustment of the upper and lower plates to the like surfaces of the needle not only is the needle acted upon by the electrical turning force to a greater degree than with the ordinary fixed plates, but also an air-damping effect is automatically produced, rendering the deflections of the needle almost or quite dead-beat, thus avoiding the ordinary waste of time in waiting for the oscillations of the needle to come to rest when reading the deflections.

It will be seen from the foregoing description and drawings that importance is attached to the narrow form, light weight, and stiffness of the needle, also to the material or materials of which it is constructed, to the compounding of two needles, so that either or both may be electrically charged, to the number of arms of the single or compound needle with the corresponding number of quadrant or sector plates to obtain the maximum torque, to the gilding or aging of the surfaces of the needle and quadrant or plates in order that the contact difference heretofore observed in making opposite deflections may be altogether eliminated or its magnitude reduced, and by tracing the error to its source to warn the operator from being misled in his readings. It is further to be observed that by providing means for adjusting the vertical position of the quadrant or sector plates the operator is enabled to obtain the maximum effect of his instrument with ease and facility.

It should be noted in using the instrument as a sensitive voltmeter reading to fractions of a volt that there is some advantage in adopting the vertical quadrant-plates, (shown in Figs. 10 and 11,) the segments being removable and adjustable to facilitate the inspection and arrangement of the arms $a\,a'$ of the needle, Figs. 12 and 13, to hang centrally in the narrow annular space between the outer and inner plates $e$; also, that in very sensitive electrostatic wattmeters it is desirable to have a finer adjustment for making the mechanical and electrical zeros coincide than in the old type of instruments, and this is conveniently done by the milled head-nut and screw $f^2$ from beneath the base $g$, as shown in Figs. 1, 2, 7, 10, and 11, adapted to raise or lower the corresponding quadrant or sector plate or a part thereof, using a fine pitch-thread on the screw to get a fine adjustment. Furthermore, in using electrostatic instruments it is sometimes desirable to produce proportionate deflections over a very wide range of the scale, although as the instruments are usually arranged a slight falling off is found in the proportion of the deflection as the range is increased. My experiments have further shown that a certain amount of air-damping upon the needle takes place when using the instruments if the space between the quadrant-plates is suitably proportioned, and by means of the adjustments provided the needle may become dead-beat, thus avoiding loss of time in taking deflection-readings; but if the plates are now brought still nearer the action of the needle becomes sluggish, so that it only creeps to the zero or deflection points.

I am aware that a pivoted circular disk of mica having two coatings of tin-foil or other metallic substance symmetrically arranged in two opposite semicircles upon the same disk has been proposed for use in a certain class of electrical measuring instruments, and that a plural number of needles with a corresponding number of inductive quadrant or sector plates have been suggested, and that cylindrical needles and semicircular inductive-plates were proposed. Furthermore, star-shaped needles and cylindrical metallic coatings arranged as sectors insulated from each other are known; but I do not make any claim thereto.

What I desire to obtain Letters Patent of the United States for is—

1. The herein-described improvements in electrostatic instruments whereby the error known as contact difference is eliminated or reduced, consisting of a mica needle coated with metal foil and suspended by a wire electrically connected to the said metal foil, and combined with quadrant or sector plates having surfaces of the same metal as the said metal foil, substantially as and for the purpose set forth.

2. The herein-described improvements in electrostatic instruments whereby the error known as contact difference is eliminated or reduced, consisting in the combination of a mica needle, coated with a precious-metal foil and suspended by a wire electrically connected to the said foil, with quadrant or sector plates, coated with the same metal as said foil, substantially as and for the purpose set forth.

3. The herein-described improvements in electrostatic instruments, whereby the error known as contact difference is eliminated or reduced, consisting in the combination of a mica needle having two or more narrow arms slightly wider at the outer ends than at the central part, coated with a thin metallic foil and suspended by a wire electrically connected to the said foil, with quadrant or sector plates having exposed surfaces of the same material as the said foil, the said needle being arranged and adapted to operate between said plates, substantially as and for the purpose set forth.

4. The herein-described improvements in electrostatic instruments whereby the error known as contact difference is eliminated or reduced, consisting of a mica needle having a plurality of narrow arms coated with metal foil, suspended by a wire thickened or reinforced next to the needle and electrically connected to the foil thereon, combined with and adapted to operate between quadrant or sector plates of the same material as said foil, and means to adjust said plates in close proximity to the plane of movement of said needle, substantially as and for the purpose set forth.

5. The herein-described improvements in electrostatic instruments whereby the error known as contact difference is eliminated or reduced, consisting of a compound needle composed of two separate needles joined together but electrically insulated from each other, each coated with metal foil, combined with means for vertically suspending and electrically charging said needle, quadrant or sector plates of like metal to the said foil, and means to adjust the said plates in close proximity to the plane of movement of said needle, substantially as and for the purpose set forth.

In testimony whereof I have signed this specification in the presence of two subscribing witnesses.

GEORGE LEONARD ADDENBROOKE.

Witnesses:
R. E. ROGERS,
H. PETER VENN.